Jan. 21, 1969 W. B. GAUNT, JR 3,423,538

TELEPHONE CONFERENCE CIRCUIT

Filed Dec. 28, 1964 Sheet 1 of 10

INVENTOR
W. B. GAUNT, JR.
BY
R. C. Winter
ATTORNEY

Jan. 21, 1969 W. B. GAUNT, JR 3,423,538

TELEPHONE CONFERENCE CIRCUIT

Filed Dec. 28, 1964 Sheet 2 of 10

FIG. 14

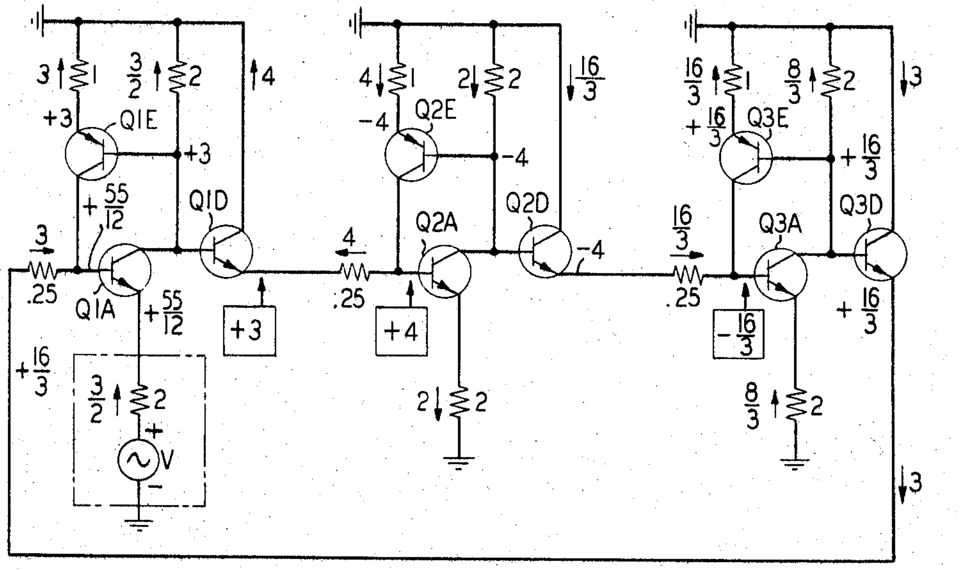

FIG. 15

| $\left\lvert \frac{V_{LINE}}{\text{DESIRED VOLTAGE}} \right\rvert$ | db GAIN | SYSTEM db GAIN |
|---|---|---|
| $\left\lvert \frac{V_2}{3.79} \right\rvert = \frac{3}{3.79} = .792$ | −2.0 | −4.0 |
| $\left\lvert \frac{V_3}{3.79} \right\rvert = \frac{4}{3.79} = 1.06$ | +.4 | −1.6 |
| $\left\lvert \frac{V_4}{3.79} \right\rvert = \frac{4}{3.79} = 1.06$ | +.4 | −1.6 |
| $\left\lvert \frac{V_5}{3.79} \right\rvert = \frac{5.33}{3.79} = 1.41$ | +3.0 | +1.0 |
| $\left\lvert \frac{V_6}{3.79} \right\rvert = \frac{5.33}{3.79} = 1.41$ | +3.0 | +1.0 |

$$Z_{in} = \frac{4.58}{1.5} = 3.06\text{K}$$

$$\text{R.L.} = 20 \log_{10} \left\lvert \frac{Z_{in} + Z_{LE}}{Z_{in} - Z_{LE}} \right\rvert = 20 \log_{10} \left\lvert \frac{3.06+2}{3.06-1} \right\rvert = 14\text{db}$$

Jan. 21, 1969 W. B. GAUNT, JR 3,423,538

TELEPHONE CONFERENCE CIRCUIT

Filed Dec. 28, 1964 Sheet 8 of 10

3,423,538
TELEPHONE CONFERENCE CIRCUIT
Wilmer B. Gaunt, Jr., New Shrewsbury, N.J., assignor to Bell Telephone Laboratories, Incorporated, New York, N.Y., a corporation of New York
Filed Dec. 28, 1964, Ser. No. 421,316
U.S. Cl. 179—18 39 Claims
Int. Cl. H04m 3/56

ABSTRACT OF THE DISCLOSURE

A conference circuit is described which employs a series of cascaded amplifiers arranged in a closed loop. One or more telephone lines are coupled to each amplifier and signals from each line are transmitted through the amplifier loop to all other lines. Negative impedance networks may be incorporated in each amplifier to improve signal transmission.

This invention relates to telephone systems and more particularly to conference circuits for establishing communication among three or more telephone lines.

Establishing a conference between three or more telephone subscribers generally presents a number of problems. First, it is necessary to maintain adequate signal levels. Second, regenerative circulation of signals among the conferees must be prevented. Third, the adjustment of various elements in the conference equipment may depend upon the number of subscribers in the conference. As a result, conference calls have heretofore required relatively delicate and complex arrangements usually employing a large number of amplifiers.

It is a principal object of this invention to provide a highly reliable and relatively inexpensive conference circuit.

It is another object of this invention to include a multiplicity of telephone lines in a common connection wherein the transmission characteristics are substantially the same as those which pertain to an ideal connection of only two lines.

It is still another object of this invention, in some embodiments thereof, to provide a conference circuit wherein the telephone lines are coupled to each other without the use of transformers, thereby allowing the conference circuit to be constructed by the use of thin-film and similar miniaturization techniques.

The conference circuit of my invention employs a series of stages arranged in a loop. Each stage includes an amplifying element, e.g., a transistor. A telephone line may be coupled to the collector circuit of each transistor. Similarly, a telephone line may be coupled to the emitter circuit of each transistor. The collector of each transistor is connected to the base of the succeeding transistor and a loop is formed. Thus, for example, six lines may be coupled to each other with the use of only three transistors. This arrangement provides for an adequate signal transmission level between the various lines and at the same time prevents regenerative circulation of signals.

The basic loop circuit is employed in all of the illustrative embodiments of my invention. There are however differentiating features among the various embodiments. These features not only improve the basic conference circuit but in addition allow the conference circuit to improve the transmission through the entire telephone system. In some embodiments of the invention transformers are not required to couple the subscriber lines to the conference circuit. In others, gain is provided in each stage of the loop to compensate for losses introduced in the remainder of the telephone system. In still other embodiments of the invention arrangements are provided to improve the input impedance seen by each line and to provide uniform gain between the lines.

It is a primary feature of this invention to provide a series of transmission stages arranged in a loop configuration with the telephone lines connected in conference being coupled to the various stages.

It is another feature of this invention, in certain embodiments thereof, to provide transformerless coupling between the ports of the conference circuit and the telephone lines.

It is another feature of this invention, in certain embodiments thereof, to provide gain in each stage of the loop to compensate for losses introduced in the remainder of the telephone system.

It is still another feature of this invention, in certain embodiments thereof, to provide arrangements for improving the input impedance seen by each line and the uniformity of gain between the lines.

Further objects, features and advantages of the invention will become apparent upon consideration of the following detailed description in conjunction with the drawing in which:

FIG. 1 symbolically shows a two-party connection and will be helpful in understanding the definitions of return loss and insertion loss;

FIG. 14 is an AC equivalent circuit which will be helpful in understanding the operation of the circuit of FIG. 12 when the switching network impedance of FIG. 13 is included in each line connected to the conference circuit;

FIG. 15 shows various transmission characteristics computed for the circuit of FIG. 12 from the analysis of the equivalent circuit of FIG. 14;

Figure 1:
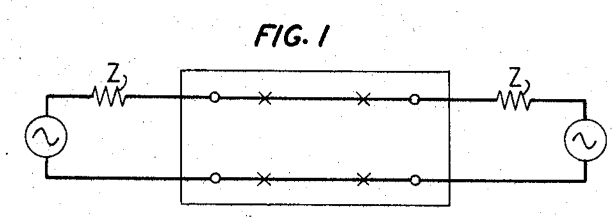

FIG. 1 symbolically shows a two-party connection. Each line may be thought of as including a signal source and an impedance Z connected in series. The lines are connected to each other through a switching network. The insertion loss, measured in db, is defined as $$20 \log_{10} \left|\frac{V_1}{V_2}\right|$$

wherein $V_1$ is one-half the voltage developed by the line generating the signal when it is open-circuited, and $V_2$ is the voltage developed across the impedance in the other line when the two lines are connected together. Ideally, $V_2=V_1$. This is in fact the case if the two line impedances are the same and the switching network and the conference circuit introduce no losses and no impedance transformations. In such a case the insertion loss is 0 and maximum power transfer from each line to the other is realized. Return loss is a measure of how much of the signal generated by each subscriber is transmitted to the other and then returned back to the originator. If $Z_1$ is the impedance of one line and $Z_2$ is the impedance of the other, the return loss is $$20 \log_{10} \left|\frac{Z_1+Z_2}{Z_1-Z_2}\right|$$

If $Z_1$ equals $Z_2$, the ideal case, the return loss is infinite. The same criteria which apply to a two-party connection apply to a conference call. For each combination of two lines the return loss should be as high as possible and the insertion loss should be as low as possible.

Figure 2:
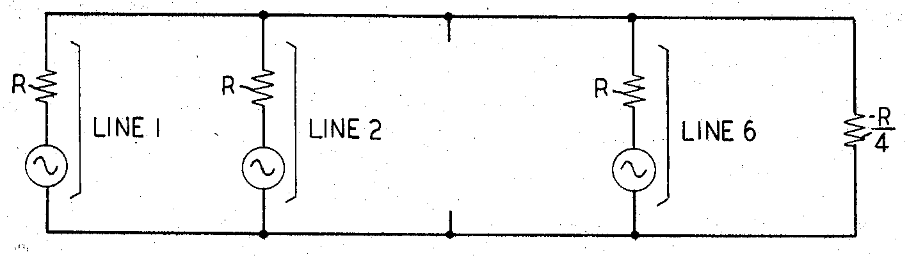
FIG. 2 PRIOR ART
FIG. 2 illustrates a well-known prior art conferencing technique.

FIG. 2 shows a typical prior art conferencing technique. Six lines are connected in parallel. Consider an individual line, for example, line 1. For ideal insertion and return losses line 1 should see an effective impedance equal to its own line impedance R (the major component of a line impedance Z is resistive). But line 1 sees five other lines in parallel, or a total resistance of $R/5$. For this reason a negative impedance of value $R/4$ is placed in parallel with the six lines. A parallel combination of two resistances, one of magnitude $R/5$ and the other of magnitude $-R/4$, results in an effective impedance of R. Consequently the return and insertion losses are the desired values.

The use of negative resistance in this manner however is dangerous unless certain precautions are taken. Suppose for example that R is equal to 2000 ohms. The negative resistance included in the conference circuit thus has a value of −500 ohms. Suppose further that the impedance of each line is not close to the ideal value of 2000 ohms and is in fact 3006 ohms (a possible condition in a telephone system using long loops coupled with other system and individual line variations). Under this condition the total parallel combination of the six line impedances is 3006/6=501 ohms. Now with the −500 ohm negative resistance device connected, the total parallel combination of the six line resistances and the negative resistance can be calculated using Ohm's law and becomes $$\frac{(501)(-500)}{(501-500)}=-\frac{(501)(500)}{1}$$

which is negative. As a result, the system will oscillate. For this reason when negative resistances have been used in the past it was necessary to include complex circuitry for insuring that the net resistance across the two common busses never went negative.

The prior art circuit of FIG. 2 has been described merely to emphasize the problems previously encountered when negative resistances have been used to improve the transmission characteristics of conference circuits. Some of the embodiments to be considered below also utilize negative impedance elements. However as will become apparent the critical adjustments required in the prior art circuits are not necessary in my invention.

Figure 3:
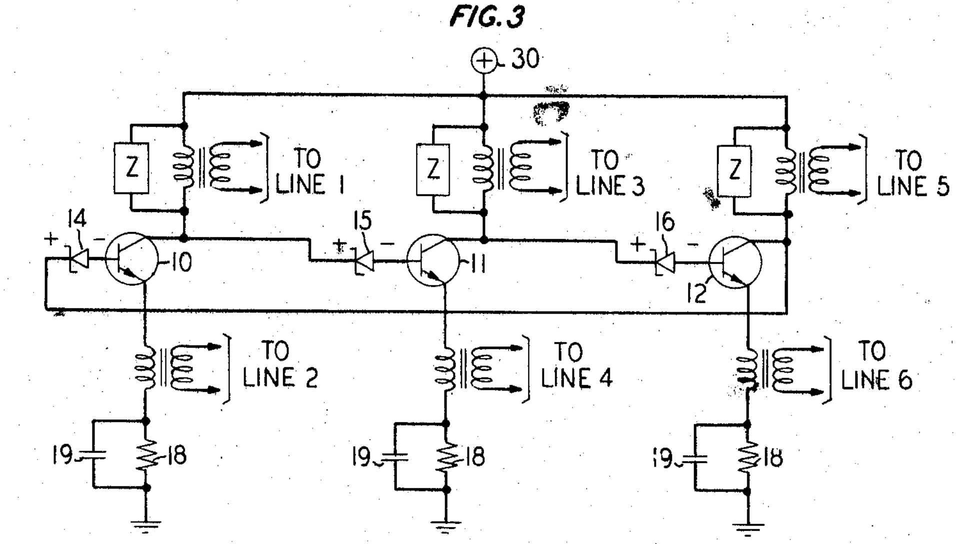
FIG. 3 is a first illustrative embodiment of the invention.

FIG. 3 illustrates a first embodiment of my invention. Six lines may be coupled to each other with only three transistors 10, 11 and 12 being required in the conference circuit. Zener diodes 14, 15 and 16 are used for biasing purposes. If the voltage of source 30 is 24 volts a suitable breakdown voltage for the Zener diodes is 12 volts. In the quiescent condition each collector voltage is at 24 volts and each base voltage is at 12 volts. Each of the emitter currents is determined by the value of the resistor 18 in each emitter circuit. Each of these resistors is by-passed by a capacitor 19 in order that the AC signals not be attenuated by the resistors 18. The basic loop configuration should be noted; i.e., each collector is coupled through a Zener diode to the base of the succeeding transistor. Two lines are transformer coupled to each of the transistors. If a signal is generated in any line the current through the respective transistor varies and directly controls the transmission of a signal to the line coupled to the same transistor. The collector voltage changes, and since it is coupled to the base of the succeeding transistor, the current in this transistor varies with the signal. This current in turn controls the transmission of the signal to the two lines coupled to the transistor and the change in its collector voltage similarly controls the transmission in the last two lines due to the collector-to-base coupling.

Figure 4:
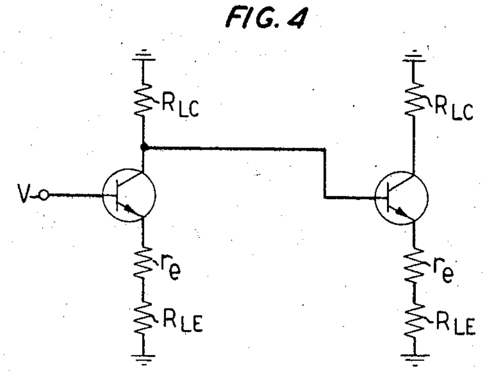
FIG. 4 is an AC equivalent circuit which will be helpful in understanding the operation of a single stage in the embodiment of FIG. 3.

The operation of the circuit of FIG. 3 may be best understood by considering FIGS. 4–7. FIG. 4 is an AC equivalent circuit which will be helpful in understanding the operation of a single stage in the conference circuit. For the moment the three collector impedances Z will be neglected. Each of the transistors may be thought of as including an effective emitter resistance $r_e$. Looking into the base of one of the transistors the impedance seen is $\beta(r_e+R_{LE})$ where $\beta$ is a characteristic of the transistor. $R_{LE}$ and $R_{LC}$ are the reflected line impedances seen respectively by the emitter and collector of each transistor. Assume that $R_{LE}$ and $R_{LC}$ are both 1000 ohms, $r_e$ is 10 ohms and $\beta$ is 100. Since $R_{LE}$ is so much greater than $r_e$ the impedance seen looking into the base of the rightmost transistor is approximately equal to $BR_{LE}$ or 100,000 ohms.

Consider first the gain from the collector line to the emitter line. Assuming that almost all of the signal current from the emitter line flows into the collector of the leftmost transistor (in the ideal case the base current of a transistor is negligible) the ratio of the collector load voltage to the emitter load voltage is $$\frac{R_{LC}}{R_{LE}+r_e} \text{ or } \frac{1000}{1010}$$

The gain is thus 0.99. Now consider the gain from the emitter line to the collector line. Assume that the emitter current is I. The current through the collector load is approximately $$\frac{\beta I}{\beta+1}$$

If V is the voltage at the base of the leftmost transistor, since in the ideal case the emitter and base voltages are approximately equal, the emitter current is $V/1010$. The impedance seen by the collector of the leftmost transistor is $R_{LC}$ in parallel with $\beta R_{LC}$ or 990 ohms, and the collector voltage, the voltage across the collector load, is $$\left(\frac{\beta}{\beta+1}\right)\left(\frac{V}{1010}\right)(990)$$

Since $\beta$ is 100 the ratio of the collector voltage V is approximately 0.07. Thus the gain from the emitter line to the collector line is approximately 0.97. The gain from either line in a transistor stage to the other line in the same stage is thus approximately 1.

The equivalent circuit of FIG. 4 has been described primarily to show why the gain of each stage is approximately unity. The operation of the entire circuit may be best understood by examining the AC equivalent circuits of FIGS. 5–7. Throughout the remainder of this description certain assumptions are made in analyzing the AC equivalent circuits. It is assumed that the base and emitter voltages of any transistor are the same. Furthermore, it is assumed that no current flows through the base of a transistor. Consequently in the circuit of FIG. 3 the collector and emitter currents of any transistor are the same and the base and emitter voltages are equal. These two assumptions are often made in analyzing the operation of a transistor circuit and while not exactly true are sufficient for determining the approximate circuit operation.

The reason for element Z in the collector circuit of FIG. 3 is the following: First, it is to be realized that this circuit is a three stage amplifier utilizing negative feedback. As such, all of the well known stability requirements for feedback amplifiers apply to this circuit, and primarily that the open loop gain-phase Nyquist plot must not encircle the $1+j0$ complex point. Second, since the impedances in the emitters and collectors are now well-controlled, being telephone subscriber lines, especially outside of the voice-frequency band, some means to ensure stability is required. For this reason, it has been found practical to use an element Z in each of the collector circuits, to obtain the necessary stability. Typically, Z might consist of a simple shunt capacitor or a series combination of a capacitor and resistor shunted across each of the collector circuits. More complex arrangements could be used; nevertheless, it is only necessary that the impedance Z modify the open loop-gain phase plot such that the feedback stability principles are obeyed. The element Z is neglected in the AC equivalent circuits now to be considered and in the remaining embodiments below, and it is assumed that the collector and emitter loads are the same. But it is to be borne in mind that in a practical circuit it may be necessary to include such an element in each collector circuit to avoid "singing" effects.

Before proceeding to analyze the AC equivalent circuits it should be understood that when the conference circuit is used each of the coupling transformers should terminate at a load. If a conference of six subscribers is required each transformer will terminate one of the lines. However the conference circuit may also be used when fewer than six subscribers desire a conference connection. In this case some of the transformers will not terminate subscriber lines. However these transformers should be connected to impedances which are equal to a line impedance. If this is not done, and assuming that the transformers are ideal, each transformer not connected to a line would reflect an infinite impedance to the respective emitter or collector. In such a case the gain of the respective stage would be nowhere near the desired value of 1. For this reason any transformer which is not connected to a subscriber line should be terminated at an impedance of the same magnitude. The equivalent circuit is the same whether or not the transformers terminate a line because the impedance reflected to the emitter and collector circuits is the same.

Figure 5:
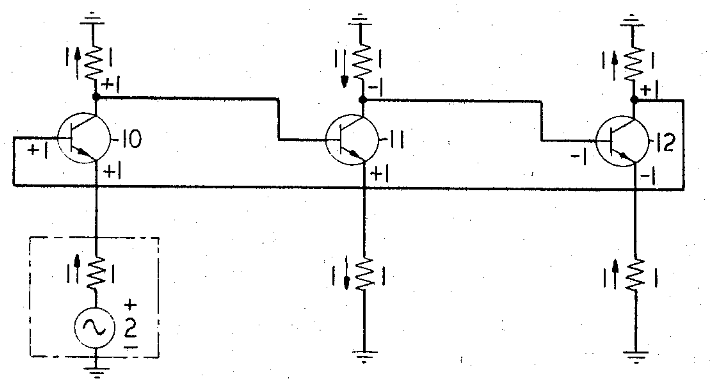
FIG. 5 is an AC equivalent circuit which will be helpful in understanding the operation of the entire circuit of FIG. 3.

An AC equivalent circuit of FIG. 3 is shown in FIG. 5. It is assumed that the driving line is that one connected to the emitter of transistor 10. It is further assumed that the AC signal generator in this line is two volts as shown. As described above the two objectives of the conference circuit are the following: (1) the impedance seen by the driving line should be equal to the impedance of the line itself, and (2) the voltage across each of the other lines should be equal to one-half the driving voltage. An analysis of FIG. 5 shows that the desired objectives are obtained with the circuit of FIG. 3. In all of the equivalent circuits to be described a number together with an arrow indicates a current magnitude in milliamperes, the arrow showing the current direction. A number preceded by a plus or minus sign indicates a voltage. A number with no sign and no arrow is a resistance value measured in kilohms. It is assumed that the reflected impedance in each emitter and collector circuit of FIG. 3 is one kilohm.

As described above it is assumed in the analysis of each equivalent circuit that the transistors are ideal elements. The base and emitter voltages of a transistor are equal and no current flows through the base of a transistor, i.e., the emitter and collector currents are equal. In FIG. 5 the line in the emitter circuit of the first transistor 10 is the driving source. The driving signal is two volts and the line impedance is assumed to be one kilohm. The method used in analyzing the circuit is as follows. It is assumed that the impedance seen by the driving line is indeed the desired value of one kilohm. The various voltages developed in the circuit are then calculated and it is shown that the actual impedance seen is the assumed value. Assuming that the impedance seen is one kilohm, i.e., the impedance seen looking into the emitter of the first transistor 10 is one kilohm, the driving source feeds into two kilohms and a current of one milliampere flows. Since all of the emitter current flows through the collector of the transistor and since none of this current flows into the base of the second transistor the current through the collector load of the first transistor is one milliampere. A voltage of one volt is developed as shown. This voltage drives the base of the second transistor 11. Since the emitter voltage of this transistor is the same as its base voltage, the voltage across the emitter load of transistor 11 is one volt and one milliampere flows through the transistor. This current similarly flows through the collector load of transistor 11 and the collector voltage of transistor 11 is −1 volt. In a similar manner the emitter voltage of the third transistor 12 is −1 volt and a current of one milliampere flows up through the transistor. A collector voltage of one volt is developed at the third transistor as shown. This voltage is applied to the base of the first transistor 10 and consequently the emitter of the first transistor 10 is also at one volt. But if the emitter of transistor 10 is at one volt only one milliampere flows through the emitter resistance. This is the value of current obtained with the assumed value of input impedance. Consequently the assumption is verified. It will be recognized that both objectives are fulfilled. The impedance seen by the driving line is one kilohm. The voltage transmitted to each of the other lines is one volt. This is the voltage which would be obtained in a two-party connection, the two-volt driving potential dividing equally across both line impedances. Although only one of the emitter lines has been considered it will be recognized that due to the symmetry of the circuit the desired action is obtained when one of the two other emitter lines is the driving source.

Figure 6:
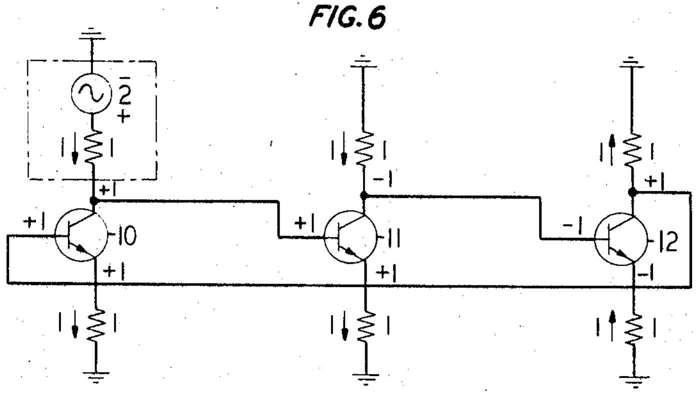
FIG. 6 is another AC equivalent circuit which will be helpful in understanding the operation of the circuit of FIG. 3.

In FIG. 6 it is assumed that the driving line is coupled to the collector of the first transistor 10. A two-volt driving source is again assumed. Again it is assumed that the impedance seen by the driving line is the desired value of one kilohm. Consequently one milliampere flows through the collector of transistor 10 and one volt is developed across the emitter load. The base of the transistor 11 is at one volt and since the emitter of this transistor is at the same potential one milliampere flows through the emitter load. This current also flows through the collector load to develop a collector voltage of −1 volt as shown. The emitter of the third transistor 12 is consequently at −1 volt and a current of one milliampere flows up through the transistor. A voltage of one volt is developed across each load and the voltage extended to the base and emitter of the first transistor 10 is one volt. Thus one milliampere flows down through the emitter load of the first transistor. This one milliampere was the value obtained with the assumed input impedance of one kilohm. Consequently the initial assumption is verified. Again it is seen that the voltage across each of the other five loads is one volt as desired and the input impedance seen by the driving collector line is one kilohm. Due to the symmetry of the circuit similar remarks apply to the two other collector lines.

Figure 7:
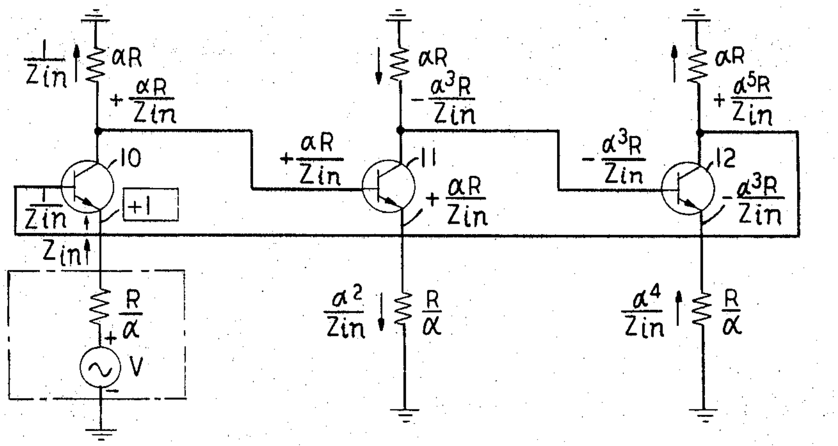
FIG. 7 is an AC equivalent circuit which will be helpful in understanding the advantages of the circuit of FIG. 3 even under extreme conditions where the impedances of the various telephone lines connected to the conference circuit of FIG. 3 vary over a wide range of values.

In the analyses of FIGS. 5 and 6 it has been assumed that all six loads were equal. In a practical system however the line impedances are often different from the mean value. With prior art circuits such as that of FIG. 2 this variation may result in oscillations. Such is not the case however with the circuit of FIG. 3. It is true that as the line impedances differ the insertion and return losses are not the ideal values. Nevertheless the circuit in no case oscillates. This can be seen from the equivalent circuit of FIG. 7. FIG. 7 illustrates a worst type of case. Instead of all of the loads being equal to the same value R, the collector loads are all equal to $\alpha$R and the emitter loads are all equal to $R/\alpha$, where $\alpha$ is some modifying quantity. It is assumed in FIG. 7 that the driving line is that one connected to the emitter of the first transistor 10. The impedance seen by the driving line is $Z_{in}$. To analyze the circuit it is necessary to assume a value of voltage or current somewhere in the circuit. It is most convenient to assume that the emitter of the first transistor 10 is at one volt. This assumed value is shown in a box in FIG. 7. If the emitter is at one volt and the impedance seen looking into the emitter is $Z_{in}$ a current of $1/Z_{in}$ milliampers flows up through transistor 10. The collector voltage developed is thus $\alpha R/Z_{in}$ volts. This voltage is extended through the second transistor into its emitter. Since the emitter load is $R/\alpha$ the emitter current is $\alpha R/Z_{in}$ divided by $R/\alpha$, or $\alpha^2/Z_{in}$ milliamperes. This current flows through the collector load of the second transistor and the collector voltage developed is $$-\alpha^3 R/Z_{in}$$

volts. In a similar manner the various voltages and currents throughout the circuit may be derived. The collector voltage of the third transistor 12 is $\alpha^5 R/Z_{in}$ volts. This voltage is the same as the base and emitter voltages of the first transistor 10. This voltage was assumed to be equal to one volt. Consequently $\alpha^5 R/Z_{in}=1$ and $Z_{in}$ equals $\alpha^5 R$. If a equals 1 the input impedance is the desired value R. But even if $\alpha$ is not equal to 1 the input impedance seen by the driving line is positive. Consequently there are no oscillations in the circuit.

It is also possible to compute the various gains in the circuit in the "worst case" of FIG. 7. With $Z_{in}$ equal to $\alpha^5$R each of the collector and emitter voltages may be expressed in terms of $\alpha$ alone. These voltages however are those developed when the emitter of the first transistor is at one volt. It is possible to determine the value of V required to produce a one-volt potential at the emitter of the first transistor. The driving source feeds into the line impedance of $R/\alpha$ in series with the equivalent input impedance of $a^5$R. One volt appears across the input impedance $\alpha^5$R and thus a current of $1/\alpha^5 R$ milliamperes must flow from the driving source. This current produces a voltage across the line impedance $R/\alpha$ of $1/\alpha^6$ volts. Thus V must be equal to $$1+\frac{1}{\alpha^6}$$

or $$1+\alpha^6/\alpha^6$$

volts. The absolute magnitude of the ratio of each load voltage to the driving source voltage may now be formed. The results are as follows:

| Load | Voltage | Ratio |
|---|---|---|
| 1st collector | $+\frac{1}{\alpha^4}$ | $\frac{\alpha^2}{1+\alpha^6}$ |
| 2d emitter | $+\frac{1}{\alpha^4}$ | $\frac{\alpha^2}{1+\alpha^6}$ |
| 2d collector | $-\frac{1}{\alpha^2}$ | $\frac{\alpha^4}{1+\alpha^6}$ |
| 3d emitter | $-\frac{1}{\alpha^2}$ | $\frac{\alpha^4}{1+\alpha^6}$ |
| 3d collector | 1 | $\frac{\alpha^6}{1+\alpha^6}$ |

It is seen that in the ideal case where $\alpha$ equals 1 each of these ratios is one-half. This is the desired value because in the two-party case of FIG. 1 half of the driving voltage appears across each of the lines. While the gains are not uniform nor are they ideal values if $\alpha$ is not equal to 1 this is not due to the conference circuit itself but is due to the variations in the lines. The important point to note is that the input impedance seen by a driving line in one of the emitter circuits is never negative. A similar analysis may be made for the case where the driving line is in the collector circuit of one of the transistors. Again while the gains are not uniform the input impedance seen by the driving line is never negative.

Figure 8:
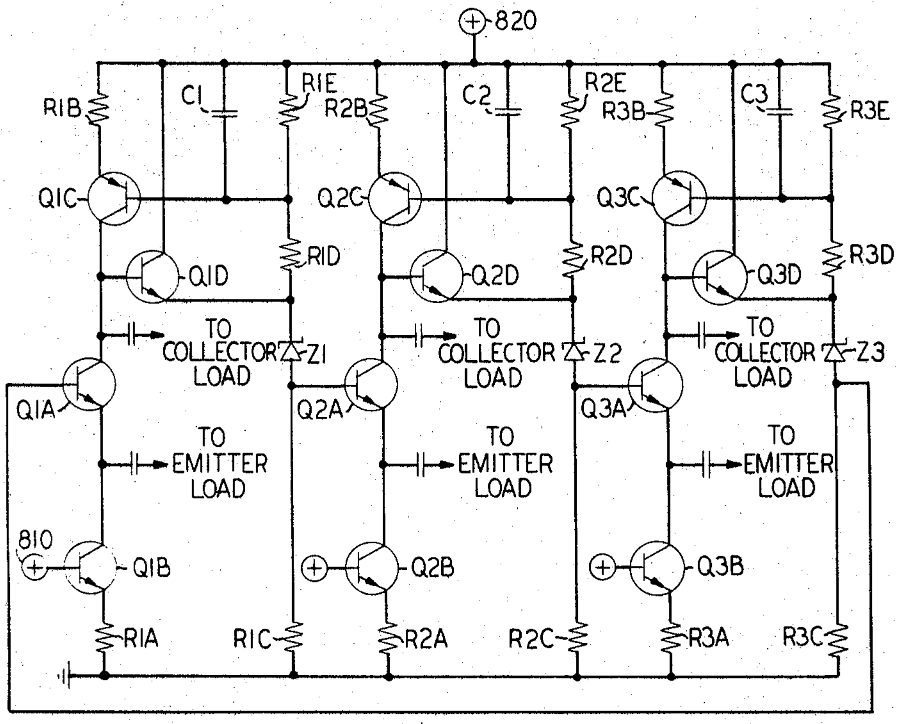
FIG. 8 is a second illustrative embodiment of the invention.

FIG. 8 shows a second illustrative embodiment of the invention. The major difference between the embodiment of FIG. 3 and that of FIG. 8 is that the latter includes no transformers. In FIG. 3 each of the subscriber lines is connected to the conference circuit through a transformer. In FIG. 8 one end of each subscriber line is connected to ground, or a source of potential if desired, and the other is connected through a capacitor to either the emitter or collector of one of transistors Q1A, Q2A and Q3A. Because no windings are required in the circuit of FIG. 8 it may be constructed by the use of miniaturization techniques. It is therefore possible to manufacture a small and cheap conference circuit having the arrangement of FIG. 8.

Each stage of the circuit includes four transistors and one Zener diode. The three transistors which are included in the basis loop are transistors Q1A, Q2A and Q3A. The B and C transistors in each stage are included for biasing purposes. The voltage source applied to the base of transistor Q1B may have a potential of four volts. The magnitude of R1A may be two kilohms. Consequently the current through transistor Q1B is two milliamperes. This current is fixed because the base and emitter terminals of transistor Q1B are held at a potential determined only by the magnitude of source 810. Thus transistor Q1B does not load the emitter line because signal variations in the current through transistor Q1A are directed to the emitter load only. Transistor Q1B serves merely to provide a biasing current of two milliamperes for transistor Q1A.

Similar remarks apply to transistor Q1C. The potential at the base of this transistor is determined by the values of resistors R1E, R1D and R1C and the breakdown potential of Zener diode Z1. The reason for not connecting the base of transistor Q1C to a separate source similar to source 810 will become apparent below. The base potential of transistor Q1C and the magnitude of resistor R1B are chosen such that the current through transistor Q1C is the same as that through transistor Q1B. Consequently two milliamperes flow through transistors Q1C, Q1A and Q1B. Because the base potential of transistor Q1C is relatively constant the transistor does not load the collector of transistor Q1A. Since transistor Q1D also draws no signal current (the impedance seen looking into the base of the transistor is very large) all of the signal current is transmitted to the collector load.

The B and C transistors in each stage control the quiescent current through the respective A transistor. However a base voltage for each of the A transistors must be established. The base voltage for each of the A transistors is established by the Zener diode and the E, D and C resistors of the previous stage. The various resistors and the Zener diode form a voltage divider and maintain the base of the succeeding A transistor at a potential smaller than that of source 820.

In FIG. 3 the collector of each transistor in the basic loop is coupled directly to the Zener diode in series with the base of the transistor in the next stage. However this is not desirable in the circuit of FIG. 8. Were the collector of transistor Q1A to be connected directly to the junction of Zener diode Z1 and resistor R1D, the resistors would load the collector of transistor Q1A. It is desired that the only load at the collector to be the collector line. For this reason transistor Q1D is interposed between the collector of transistor Q1A and the junction of Zener diode Z1 and resistor R1D. The voltage of the collector of transistor Q1A is transmitted directly through transistor Q1D to the junction since the base and emitter voltages of transistor Q1D are the same. However the impedance seen looking into the base of transistor Q1D is very large, and thus the transistor does not load the collector of transistor Q1A.

The resistors are also used for biasing transistor Q1C, the base of this transistor being held at the potential of the junction of resistors R1E and R1D. Capacitor C1 is included for by-pass purposes. As the signal current flows and the collector voltage of transistor Q1A varies, the junction of the emitter of transistor Q1D and Zener diode Z1 changes in potential. This change in potential would cause the junction of resistors R1D and R1E to change in potential were capacitor C1 not included in the circuit. This change would in turn affect the conduction of transistor Q1C and the current through transistor Q1A. This of course is undesirable and by including capacitor C1, all signal variations in voltage which would otherwise appear at the junction of resistors R1D and R1E are shorted through the capacitor. Thus the conduction of transistor Q1C is not affected by signal variations.

It is not desirable to bias the base of transistor Q1C directly from a separate source such as 810. The feedback resulting from the connection of the base of transistor Q1C to the junction of resistors R1E and R1D is instead advantageous. The current through transistors Q1B is two milliamperes. Suppose that the base of transistor Q1C were biased by a separate source to also provide a quiescent current of two milliamperes through the transistor. Due to temperature and other changes the current through transistor Q1C might increase slightly, for example, to 2.1 milliamperes. The current through transistor Q1A is fixed at two milliamperes because this is the value of the current through transistor Q1B. An attempt by the current through transistor Q1C to increase above this value results in the saturation of transistor Q1C. This in turn results in the AC loading of the collector of transistor Q1A. Thus were a separate source used to bias the base of transistor Q1C the DC instability of the circuit could result in the AC loading of transistor Q1A. The use of the resistor network to bias transistor Q1C provides the required DC stability. If the quiescent current through transistor Q1C tends to increase, the emitter of transistor Q1D rises in potential. Consequently the base of transistor Q1C also rises in potential to maintain the current through transistor Q1C at the desired value of two milliamperes. The DC negative feedback thus provides the required DC stability.

A similar biasing arrangement is provided for the other two stages of the circuit in FIG. 8. Assuming that the transistors are ideal, all insertion and return losses for the circuit of FIG. 8 are the ideal values because the AC equivalent circuit for the arrangement of FIG. 8 is the same as that for the arrangement of FIG. 3.

Figures 9, 10:
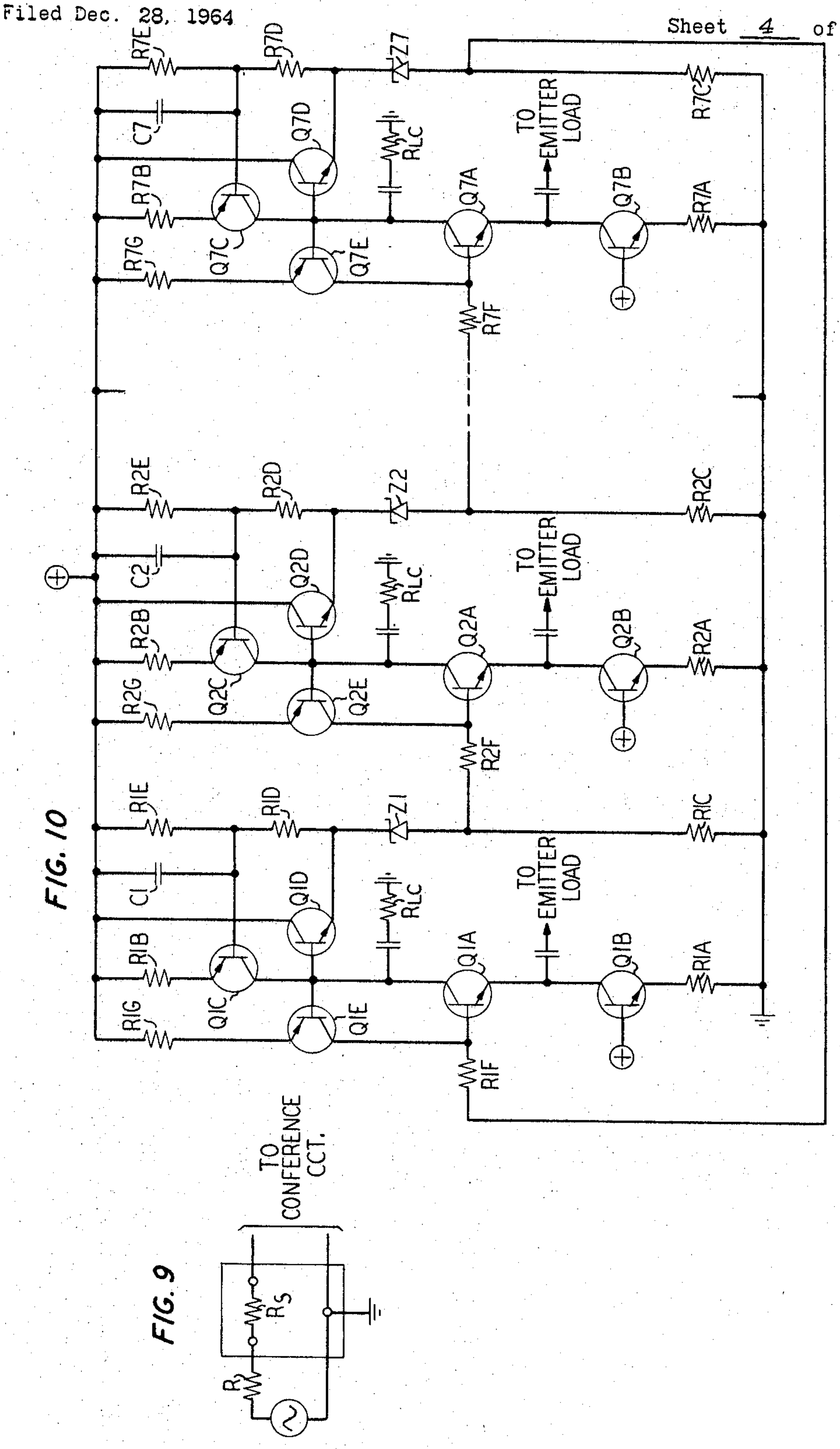
FIG. 9 illustrates a first type of impedance which may be introduced by the switching network connecting each subscriber line to a conference circuit.
FIG. 10 is a third illustrative embodiment of the invention.

The discussions above pertaining to insertion and return losses have been predicated on the fact that each line may be thought of as a signal source in series with an equivalent line impedance and that each line is connected directly to the conference circuit at an emitter or collector port. In a practical telephone system however such is not the case. While each line may be thought of as including a signal source in series with an equivalent impedance, the switching network which connects the line to the conference circuit also introduces some impedance. In FIG. 9 the switching network is assumed to introduce a series resistance $R_S$. This while the conference circuits of FIGS. 3 and 8 provide ideal transmission characteristics for ideal telephone systems, in a practical case even if the conference circuit is ideal the transmission characteristics will not be. The circuit of FIG. 10 is designed to provide amplification (negative resistance) in each stage of the loop. This amplification allows the ideal values of insertion and return losses to be obtained even where the switching networks connecting the lines to the conference circuit introduce series resistance in each line.

There are two basic differences between the circuit of FIG. 8 and the circuit of FIG. 10. First, each stage includes an additional two resistances, e.g., R1F and R1G, and an extra transistor, e.g., Q1E. This combination provides the necessary amplification to improve the values of both insertion loss and return loss for each line. The second difference is that the collectors of the A transistors in FIG. 10 do not terminate lines. Instead the collector load for each transistor is merely a resistance. For this reason the circuit of FIG. 10 requires more stages than that of FIG. 8 since only one line can be coupled to each stage. In fact, seven stages are required for a six-party conference. The basic loop is stable only if an odd number of stages are included in it. Each stage introduces a 180-degree phase shift and if an odd number of stages are included in the circuit the total phase shift around the loop is 180 degrees and the circuit is stable. However an even number of stages would result in positive feedback and oscillations. For this reason seven stages are required if a six-party conference is to be established. (The circuit of FIG. 10 may thus be used for a seven-party conference if required.) The compensating effect of the additional elements in each stage improve the insertion and return losses only if subscriber lines do not comprise the collector loads as will become apparent from the following analysis of FIG. 11, FIG. 11 being the AC equivalent circuit for FIG. 10 when the emitter line of the first stage is the driving source.

Figure 11:
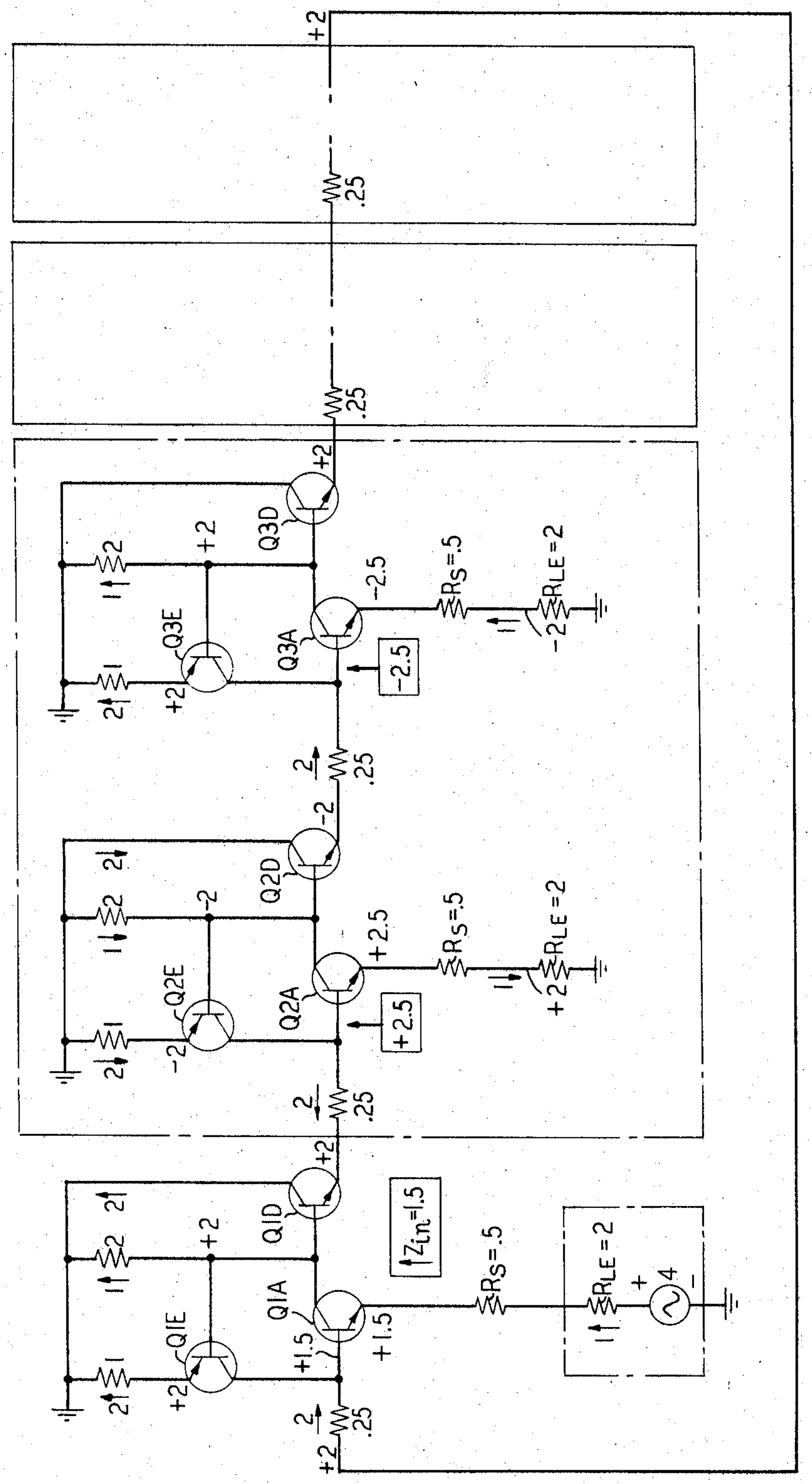
FIG. 11 is an AC equivalent circuit which will be helpful in understanding the operation of the circuit of FIG. 10 when the switching network impedance of FIG. 9 is included in each line connected to the conference circuit.

The AC equivalent circuit is derived as follows. Each line impedance is assumed to be two kilohms. The switching network impedance $R_s$ introduced by the switching equipment connecting each line to the conference circuit is assumed to be 0.5 kilohm. The G resistors are all one kilohm, and the F resistors are all 0.25 kilohm. It will be noted that the B and C transistors in each stage are not included in the equivalent circuit. These transistors are omitted because they are used for biasing purposes only and present infinite AC impedances. The collector load for each of the A transistors is $R_{LC}$, two kilohms, the value of a line impedance. The emitter of each of the D transistors is connected directly to the F resistor in the next stage, since the Zener diodes can be omitted in the AC equivalent circuit. While each D emitter is also connected to a series resistor-capacitor combination, and the Zener diode is connected to an additional C resistor, the C and D resistors in each stage are large enough in magnitude to be neglected in the AC analysis. The voltage developed at the junction of the E and D resistors in each stage is required only for biasing purposes and in an analysis of the AC operation the C, E and D resistors and the by-pass capacitor in each stage may be neglected. In FIG. 11 only three stages are shown. The various voltages developed in the fourth and fifth stages and the sixth and seventh stages are identical to those developed in the second and third.

The impedance of each line is assumed to be two kilohms, and the driving voltage is assumed to be four volts. For a perfect insertion loss the voltage developed across each of the other lines should thus be two volts. The driving line sees a switching network impedance of 0.5 kilohm in series with $Z_{in}$, where $Z_{in}$ is the impedance seen looking into the emitter of transistor Q1A. For an infinite return loss the driving line should see two kilohms and since the switching network introduces 0.5 kilohm of impedance, for an ideal return loss $Z_{in}$ should be 1.5 kilohms. The method used in the analysis is to assume that $Z_{in}$ is the desired value and to compute the various voltages developed across the other lines. If a consistent set of voltages is developed in the loop the assumed value of $Z_{in}$ is verified.

Assuming that $Z_{in}$ is 1.5 kilohms the driving source sees its own line impedance in series with $R_s$ (0.5 kilohm) and $Z_{in}$. The total impedance is four kilohms and one milliampere flows into the emitter of transistor Q1A. This current flows from the collector of transistor Q1A through the two-kilohm resistance ($R_{LC}$) to ground since no current enters the bases of transistors Q1E and Q1D. A voltage of two volts is developed across the resistor and this voltage is extended to the emitters of both transistors Q1E and Q1D. Since the emitter of transistor Q1E is at two volts, two milliamperes flow through the transistor and the one-kilohm emitter resistor. These two milliamperes must flow through $R_{1F}$, assumed to be 0.25 kilohm, since no current flows into the base of transistor Q1A. The voltage developed across the 0.25-kilohm resistor is thus 0.5 volt. The emitter of transistor Q1A, and therefore the base, is at a potential of 1.5 volts, since the voltage drop across $R_{LE}$ and $R_s$ is 2.5 volts. Consequently the left side of the 0.25-kilohm resistor is at a potential of two volts. In computing the various voltages in the remaining stages, if the collector voltage of the seventh stage is seen to be two volts, equal to the voltage at the left end of resistor $R_{1F}$, the assumed value of $Z_{in}$ is verified.

Since the base of transistor Q1D is at two volts so is its emitter. In analyzing the second stage of the circuit it is assumed that the base of transistor Q2A is at a potential of 2.5 volts. Since the emitter is also at this potential one milliampere flows down through the 2.5 kilohms of the the series combination of $R_{LE}$ and $R_s$. This one milliampere causes two volts to be developed across $R_{LE}$—the required value for perfect insertion loss between the driving line and the line connected to the second stage. The one milliampere through transistor Q2A causes a two-volt drop across the collector load of two kilohms. The −2 volt potential is extended to the emitter of transistor Q2E and two milliamperes flow down through this transistor. The current flows through the 0.25-kilohm resistor and through transistor Q1D to ground. Consequently 0.5 volt is developed across the 0.25-kilohm resistor. The left side of the resistor was seen to be at two volts. Thus the right side is at 2.5 volts, verifying the assumed value.

The −2 volts at the base of transistor Q2D are extended to the emitter of the transistor. In analyzing the third stage another voltage value is assumed for the base of transistor Q3A. This time −2.5 volts are assumed. The emitter of transistor Q3A is at the same potential and one milliampere thus flows up through the total emitter load of 2.5 kilohms. Again, two volts are developed across the emitter load; the insertion loss is ideal. The two milliamperes flow through the collector load of transistor Q3A and the collector of this transistor has a potential of two volts. Since the emitter of transistor Q3E is at two volts, two milliamperes flow up through the transistor. These two milliamperes must come from transistor Q2D through the 0.25-kilohm resistor connected to the collector of transistor Q3E. The voltage developed across the 0.25-kilohm resistor is thus 0.5 volt, the left side being positive with respect to the right side. Since the left side of the resistor is at a potential of −2 volts the right side is at a potential of −2.5 volts, verifying the assumed value.

Since the base of transistor Q3D is at a potential of two volts so is its emitter. The emitter of this transistor is connected to the fourth stage. The fourth and fifth stages are identical to the second and third stages and since the input to the second stage is also two volts, the voltages developed in the fourth and fifth stages are identical to those developed in the second and third stages. Similar remarks apply to the sixth and seventh stages. The emitter of the D transistor in the last stage is at the same potential as the emitter of the D transistor in the third stage, two volts. Since this emitter is connected to the left side of the 0.25-kilohm-resistor of the first stage the assumed value of $Z_{in}$ is verified since a consistent set of voltages is developed in the circuit. It is thus seen that the circuit of FIG. 10 provides the ideal values for insertion and return losses even though the telephone system itself in which the conference circuit is used is not ideal.

Each stage in the circuit of FIG. 10 is coupled to only one line. For the ideal values of return and insertion losses to be obtained the collector load of each of the A transistors must equal the line impedance (two kilohms). Were lines coupled to the collectors of the A transistors, the collector loads would be 2.5 kilohms because of the impedances introduced by the switching network. For this reason the ideal values of return and insertion losses are obtained only if lines are coupled to only the emitters of the A transistors. A similar result could be obtained if lines were coupled to only the collectors of these transistors. The problem with a configuration such as that of FIG. 10 is that the number of stages must equal the number of lines for which the conference circuit is designed if the number is odd, and one more than this number if the maximum number of lines for which the conference connection is required is even. In a practical system each stage will not introduce the ideal phase shift of 180 degrees. Were each stage to introduce a 180-degree phase shift no oscillations would be possible. But if each stage introduces slightly more or slightly less than 180 degrees of phase shift, oscillations are possible. Oscillations result when an additional 180 degrees of phase shift are introduced in the loop. Thus if each stage introduces an extra 180/7 or 25.71 degrees of phase shift, or 25.71 degrees phase shift too little, the circuit oscillates. For this reason it might be advisable in some applications to couple two lines to each stage rather than only one. While the return and insertion losses are not ideal, the fewer stages required in the circuit result in a greater circuit stability. The circuit of FIG. 12 is the same as that of FIG. 10 except that only three stages are provided and two lines are coupled to each stage rather than only one.

Figure 12:
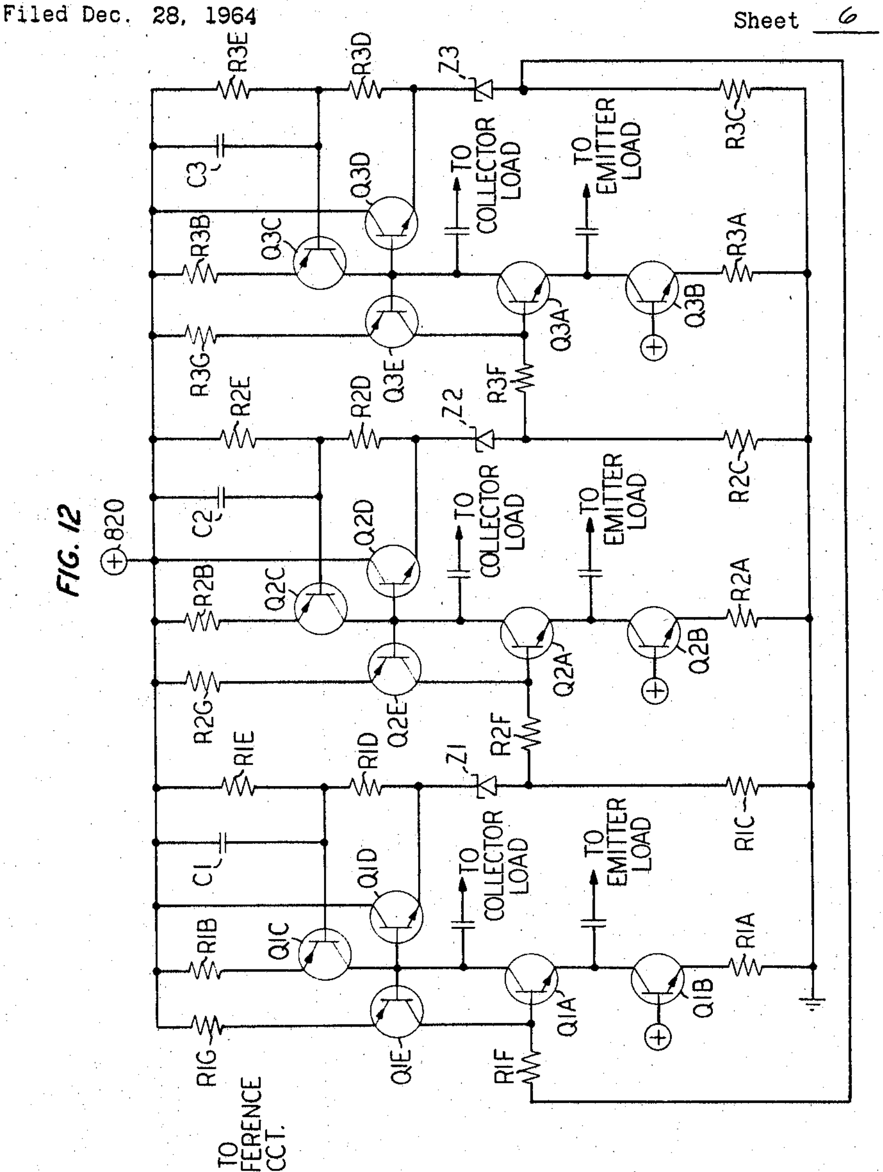
FIG. 12 is a fourth illustrative embodiment of the invention.
Figure 13:
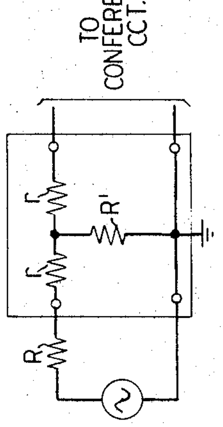
FIG. 13 is a second type of impedance which may be introduced by the switching network connecting each line to the conference circuit.

The analysis of the operation of the circuit of FIG. 12, the fourth illustrative embodiment of the invention, is similar to that considered above for the circuit of FIG. 10. The insertion and return losses may be computed for the two cases where the driving line is coupled to the collector and emitter of one of the A transistors. In the analysis considered immediately above it was assumed that the switching network introduces a series impedance in each line. In some types of telephone systems the impedance introduced can be shown to be electrically equivalent to the type shown in FIG. 13. Here the impedance introduced consists of two small resistances each of value $r$ shunted by a large resistance $R'$ forming a "T" pad. In a well-designed system, this "T" pad has a characteristic impedance which equals the terminal impedances. As a result the "T" pad introduces "flat" loss. The loss is usually measured in db. In the analysis of a circuit in which each line is connected through the network of FIG. 13 to the conference circuit, the resistance "T" pad may be neglected when computing the voltage, in db, transmitted to each line from the driving source. After the signal level is computed for each line, the actual signal level in db is derived by subtracting the flat loss introduced by the pad from the computed value. FIG. 14 is the AC equivalent circuit for FIG. 12 where each load is shown as comprising a line impedance of two kilohms. There are no $R_s$ impedances. The equivalent circuit for each stage of FIG. 14 is basically the same as that for each stage in FIG. 11. The collector load for each of the A transistors is again two kilohms, the impedance presented by a subscriber line. The emitter loads are two kilohms rather than 2.5 kilohms. In FIG. 14 it is assumed that the emitter line of the first stage is the driving source. The input impedance seen by the driving line may be computed along with the voltage developed in each of the other five lines. The actual gains from line to line may then be determined by subtracting from each computed value the loss introduced by each of the flat loss pads. Since the pads do not affect to any appreciable degree the currents and voltages in the circuit they are neglected in FIG. 14.

In FIG. 14 each of the line impedances is two kilohms. The driving source voltage V thus feeds through a two-kilohm impedance into the emitter of transistor Q1A. It is assumed that the emitter of transistor Q1D is at three volts. Consequently the base of this transistor is at the same potential and 1.5 milliamperes flow up through the collector load of transistor Q1A. (This current also flows through the emitter load of transistor Q1A.) A 3-volt potential drop is developed across the collector load. The emitter of transistor Q1E is also at a potential of three volts and three milliamperes flow up through the transistor, this current also flowing from left to right through the 0.25-kilohm resistor in series with the collector of transistor Q1E. Although the drop across the 0.25-kilohm resistor may be computed the voltage at the junction of the collector of transistor Q1E and the base of transistor Q1A is not yet known.

To compute the voltage at various points in the second stage it is assumed that the base of transistor Q2A is at four volts. The emitter of the transistor is at the same potential and two milliamperes flow down through the transistor and the collector and emitter loads. The base of transistor Q2E is thus at −4 volts and since the emitter of this transistor is at the same potential four milliamperes flow from right to left in the 0.25 kilohm resistor in series with the collector of transistor Q2E. A one-volt potential drop is developed across the resistor due to the four milliampere current which flows through it and transistor Q1D. Since the emitter of transistor Q1D is at three volts the base of transistor Q2A is at four volts, as assumed.

The base and emitter potentials of transistor Q2D are −4 volts. The base of transistor Q3A is assumed to be at a potential of −16/3 volts. In a similar manner the currents in the third stage may be computed and the assumed value of voltage may be verified. The base and emitter potentials of transistor Q3D are 16/3 volts. This is the potential of the left side of the leftmost 0.25-kilohm resistor in the circuit. Since the current through this resistor is three milliamperes the voltage across it is 0.75 volt. The base of transistor Q1A is thus at a potential (16/3)+(3/4), or 55/12 volts. The emitter of transistor Q1A is at the same potential. The drop across the emitter load of transistor Q1A is three volts. Consequently the magnitude of the voltage V required to produce the various voltage and current magnitudes derived throughout the circuit after assuming that the emitter of transistor Q1D is at a potential of three volts, is (55/12)+3, or 7.58 volts.

The voltage across the five nondriving lines may be computed by multiplying each line impedance of two kilohms by the current flowing through it. The ideal voltage for each line is one half of 7.58, or 3.79 volts. The actual voltages derived for the various lines are the following. The collector load of transistor Q1A has a voltage drop across it of three volts. Both loads in the second stage have a drop of four volts across them and both loads in the third stage have a drop of 16/3 volts across them. In FIG. 15 the absolute magnitude ratio of each line voltage to the desired voltage is shown. The five ratios are also shown in db. As described above there is an additional loss in each line due to the equivalent resistance pads introduced by the switching network which connects the lines to the conference circuit. If the loss introduced by each pad is 1 db, the computed gain from line to line must be decreased by 2 db to derive the actual system gain. These values are shown in the last column of the table of FIG. 15. Two of the lines actually have a net gain. Another two have a loss of only 1.6 db, and only one line has a loss of 4 db.

Thus if only three stages are used for a six-party conference circuit the gains are nonuniform, unlike the case of FIG. 10. The nonuniformity of gain is not serious. What is essential is that the input impedance seen by the driving line always be positive in order that no oscillations occur. The input impedance $Z_{in}$ may be computed by dividing the voltage at the emitter of transistor Q1A, 55/12 volts, by the current entering the terminal, 1.5 milliamperes. The input impedance is thus 3.06 kilohms. The return loss may now be computed. Referring to FIG. 15 $Z_{LE}$ is the impedance of the driving line, 2 kilohms, and the return loss is 14 db. This is high enough to prevent any appreciable "singing" effects.

It must be borne in mind that the motivation for introducing the negative resistance combination in each stage of the circuit is not due to the operation of the conference circuit itself. The insertion and return loss values for the conference circuit of FIG. 8 are ideal if no impedance is introduced in each line by the switching network connecting the lines to the conference circuit. In a practical system however the switching network does introduce some impedance. The gain introduced in each stage compensates for the imperfect connections. If only one line is coupled to each stage as in FIG. 10, and the switching network impedance is of the type shown in FIG. 9, the ideal values of insertion and return losses may be obtained, the conference circuit completely compensating the losses introduced by the switching network. Perfect compensation may not be obtained however if two lines are coupled to each stage as may be required in a practical system. The transmission characteristics of the over-all system may still be improved however if gain is introduced in each stage. The analysis immediately above is directed to the case where the switching network impedance introduced is that shown in FIG. 13 and the driving line is one of the three emitter loads. A similar analysis may be made for the case where a collector line is the driving source. Similarly the impedance $R_s$ of FIG. 9 may be included in each load if the switching network impedance is of the series type rather than the pad type. Similar results are obtained. In fact, if in the circuit of FIG. 14 the driving line is one of the collector loads it can be shown that identical insertion loss values are obtained. Only the input impedance changes, $Z_{in}$ now being 1.31 kilohms rather than 3.06 kilohms. The same value for return loss, 14 db, is obtained.

Figure 16:
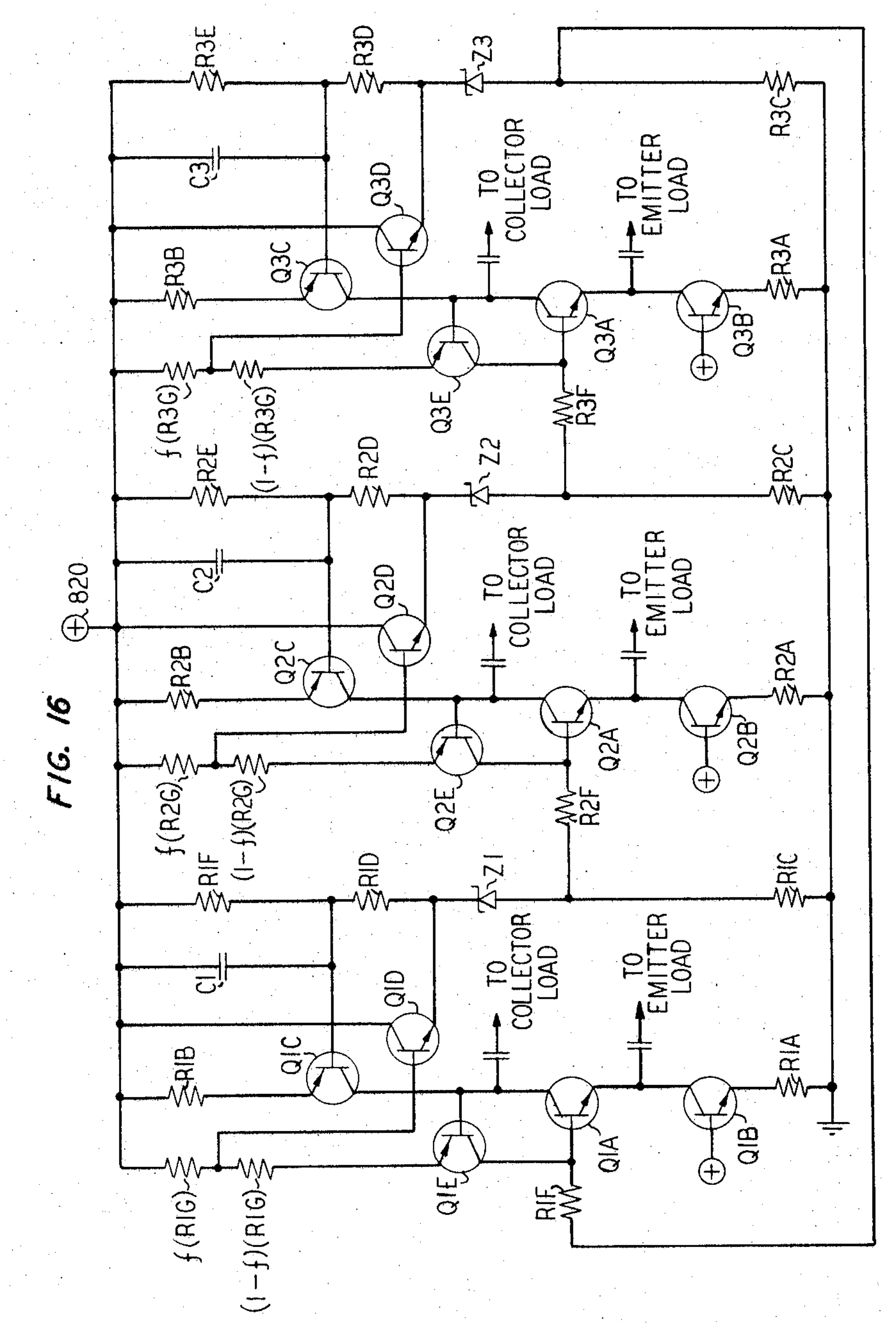
FIG. 16 is a fifth illustrative embodiment of the invention.

FIG. 16 is a fifth illustrative embodiment of the invention. The basic configuration is similar to that of FIG. 12. Each stage includes the additional F resistor in series with the base of the A transistor, and the additional E transistor and G resistor. There is one basic difference however. In FIG. 12 (and in FIG. 10) the base of each of the D transistors is driven directly from the collector of the respective A transistor (whose potential is the same as that of the emitter of the E transistor), the D transistor serving to connect the collector of each of the A transistors to the base of the A transistor in the succeeding stage. In FIG. 16 however the collector of the A transistor in each stage is not connected to the base of the respective D transistor. Instead the G resistor in each stage now comprises two separate resistors and the junction of the two resistors is connected directly to the base of the D transistor to drive the next stage. The G resistors in FIG. 12 are each one kilohm (see FIG. 14). The total resistance in the emitter circuit of the E transistor in each stage of FIG. 16 is also one kilohm. The number $f$ is between 0 and 1. The top resistor of each pair has a magnitude of $f$ kilohm and the lower resistor of each pair has a magnitude of $(1-f)$ kilohm. In FIG. 12 the base of each of the D transistors is driven by the collector voltage of the respective A transistor. The collector voltage of the A transistor is the same as the base and emitter voltages of the E transistor. Thus in the circuit of FIG. 16 instead of each of the D transistors being driven by the full collector voltage of the A transistor it is driven by only a fraction of this voltage, namely, this voltage multiplied by $f$.

The reason for introducing the term $f$ in the circuit is that the additional variable allows more adjustments to be made. For example, it is possible to choose a value of $f$ such that the return loss for each line is infinite, i.e., $Z_{in}$ for each line is two kilohms. This assumes that the switching network impedance introduces a flat loss. The various gains are nonuniform but are all improved. Other values of $f$ result in improved gains but a smaller return loss. In any practical system a compromise must be made since the values of insertion and return losses can be improved only at the expense of each other. Analyses similar to those presented above may be made for the circuit of FIG. 16 to derive actual values of return and insertion losses for given values of $f$. In all cases oscillations can be avoided and the circuit is stable. It must be borne in mind that the non-ideal values of return and insertion losses which are obtained are not due to deficiencies in the conference circuit itself. On the contrary the "simple" circuit of FIG. 8 provides the ideal values if the switching network is ideal. The gain introduced in each of FIGS. 10, 12 and 16 compensates to various degrees for the imperfections in the remainder of the telephone system.

Figure 18:
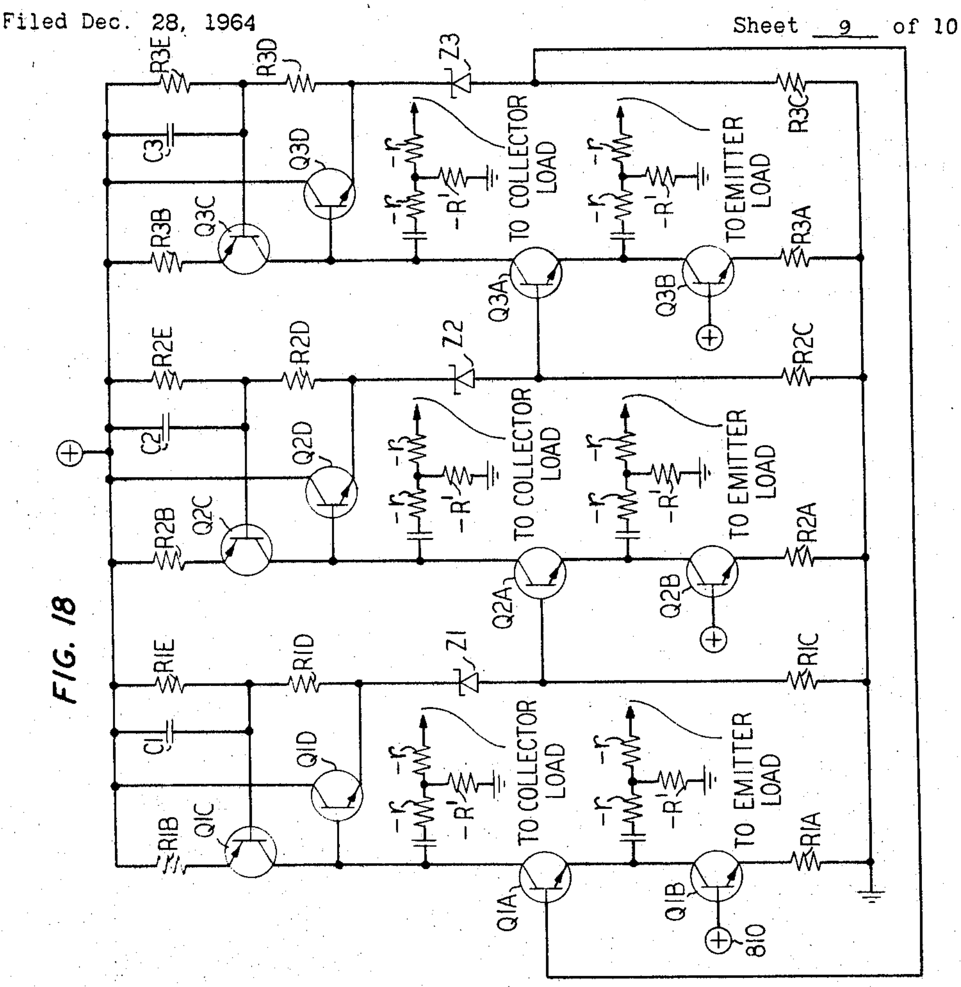
FIG. 18 is a sixth illustrative embodiment of the invention.

FIG. 18 is the sixth illustrative embodiment of the invention and provides perfect compensation with only three stages, i.e., the values of return and insertion losses are ideal. It will be recalled that the ideal values are obtained with the circuit of FIG. 8 if the load seen by each of the conference ports is the line impedance. Each port in FIG. 18 includes a negative resistance pad which completely compensates the impedance introduced by the switching network, assuming the impedance is of the type shown in FIG. 13. Since the impedance introduced by the switching network is completely cancelled the ideal values of insertion and return losses are obtained.

Figure 17:
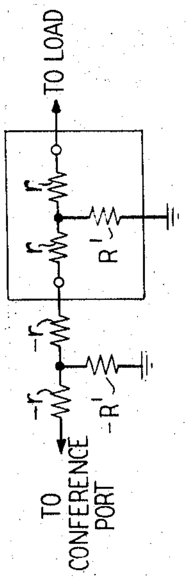
FIG. 17 illustrates a resistance arrangement used in each stage of the circuit of FIG. 18.

Each of the ports in FIG. 18 includes a negative resistance pad including two resistances of value $-r$ and one of value $-R'$. Any of many well known types of negative resistances may be used. For example, the negative resistance circuit comprising transistors Q1A and Q1E and resistor R1F of FIG. 16 may be used to provide each of the $-r$ and $-R$ elements of the negative resistance pad of FIG. 17. Referring to FIG. 17 it is seen that each of the negative resistance pads in series with a port is in series with the switching network impedance. The two resistances $r$ and $-r$ in the middle of the total network cancel each other out and may therefore be short circuited. The resulting parallel combination of R and $-R$ results in a total shunt impedance of $$(R)(-R)/(-R+R)$$

This shunt impedance of infinite magnitude may therefore be neglected. The only resistances remaining are the two outer ones, $-r$ and $r$, which are effectively in series. These resistances also cancel out each other and the net result is that each of the conference ports is connected directly to a line through an effective impedance of 0. Consequently even though the switching network does introduce some impedance in each line, each of the conference ports sees an ideal line and the ideal values of insertion and return losses are obtained. If the effective impedance introduced by the switching network is of a configuration other than that shown in FIG. 13 an equivalent negative resistance pad may be included in each conference port to provide the ideal values of insertion and return losses.

Figure 19:
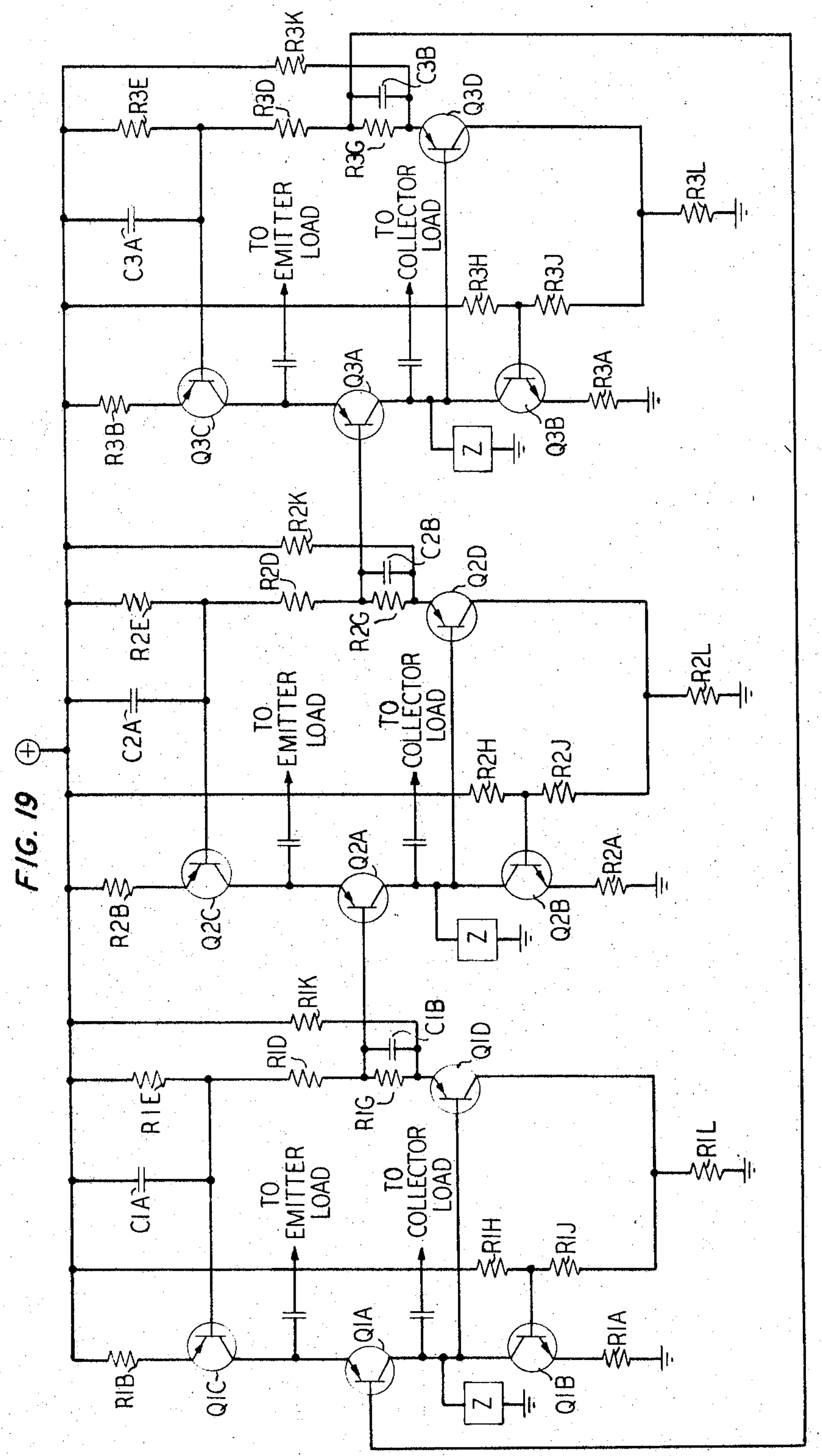
FIG. 19 is a seventh illustrative embodiment of the invention.

The embodiment of FIG. 19 shows still another way to improve the transmission characteristics of the conference circuit. Although the gain of each stage in the circuit of FIG. 8 is approximately unity, due to the fact that the transistors are not ideal the gain is slightly less than this ideal value. In the embodiment of FIG. 19 a scheme is shown for increasing slightly the gain of each stage in order that the gain from one stage in the loop to another be nearer to the ideal value of unity.

The biasing scheme for the circuit of FIG. 19 is similar to the basic scheme shown in FIG. 8. However there are a few differences between the two circuits. The base of the B transistor in each stage is no longer biased directly from a separate source. Instead of voltage divider network, including resistors R1H, R1J and R1L in the first stage, is used to bias the base of each of the B transistors. This resistor network is used in order that a slight amount of positive feedback be introduced in each stage of the conference circuit such that the gain be nearer to the ideal value of unity. The base of the D transistor in each stage is again connected to the collector of the respective A transistor. A Zener diode however no longer connects the emitter of each D transistor to the base of the A transistor in the succeeding stage. A parallel resistor capacitor combination, resistor R1G and capacitor C1B in the first stage, is included in each stage instead of the Zener diode. The capacitors short circuit the AC signals in FIG. 19 as do the Zener diodes in FIG. 8. The G resistors provide a voltage drop for biasing purposes as do the Zener diodes. The resistor-capacitor combination in each stage is merely another way to bias the various A transistors. The K resistor in each stage is included for biasing purposes as well, and in this case improves the dynamic current range of the D stage. Each stage includes the Z network described with reference to FIG. 3. The Z network is included in any conference circuit where it is desired to improve the system stability. Corresponding transistors in FIGS. 8 and 19 are not all of the same type. For example, the A transistors are of the PNP type rather than the NPN type. These differences in FIG. 19 have been introduced primarily for the purpose of showing alternative schemes.

Figure 20:
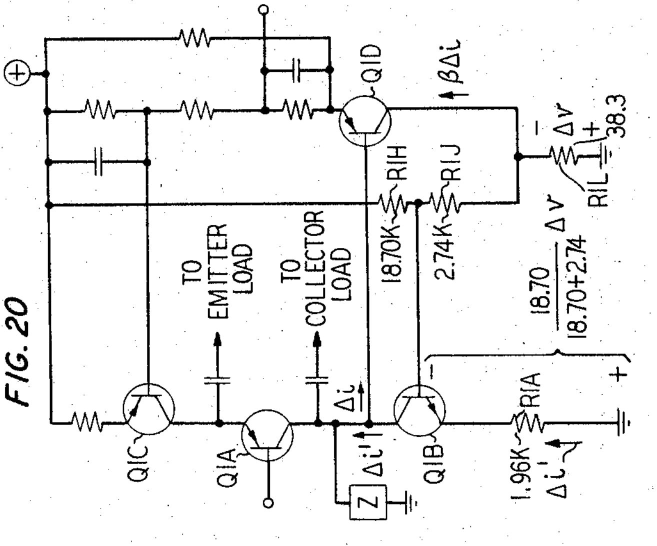
FIG. 20 shows one stage of the circuit of FIG. 19 with various circuits, voltages and component values being indicated for the purpose of describing the operation of FIG. 19.

It will be recalled that in the analyses above of the various embodiments of the invention it was assumed that the transistors were ideal and that no current was drawn by the base of a transistor. As described at the beginning of the specification however, in a practical case the base of a transistor draws a slight amount of current and for this reason the gain of each stage is not unity although it approximates this value. The resistor network including the H, J and L resistors, in each stage is so proportioned that a proper amount of positive feedback to increase the gain of each stage nearer to the ideal value, in accordance with the average transistor B, is realized. The positive feedback may be understood with reference to FIG. 20 which shows the first stage of the circuit of FIG. 19 together with various current, voltage and component values.

In an ideal case all of the collector current from transistor Q1A would flow to the collector load. This would indeed be the case if transistor Q1B were biased at its base by a separate voltage source and the base of transistor Q1D were to draw no current. In the following analysis it is assumed that a negative signal at the base of transistor Q1A causes an increased collector current to flow and some small portion of this current, $\Delta i$, flows into the base of transistor Q1D. As will be seen below this current generates the positive feedback.

The degree of feedback is slight since only a small amount of gain is required. In this regard it should be noted that resistor R1L is measured in ohms while resistors R1A, R1H and R1J are measured in kilohms. The current $\Delta i$ which enters the base of transistor Q1D is amplified and the current $\beta\Delta i$ flows into the collector of the transistor. This current comes almost exclusively through resistor R1L since this resistor is small compared with the other resistors in the circuit. If $\Delta i$ is measured in amperes the resulting voltage $\Delta v$ developed across resistor R1L is $38.3(\beta\Delta i)$ volts as shown.

Resistor R1L is in parallel with the series combination of resistors R1J and R1H. The voltage developed at the base of transistor Q1B is thus $18.70\Delta v/(18.70+2.74)$ or $0.87\Delta v$. Since the base and emitter terminals of transistor Q1B are at approximately the same potential the additional voltage appears across resistor R1A. The current $\Delta i'$ which flows up through this resistor is thus $0.87\Delta v/1960$ amperes. Almost all of this current flows out of the collector of transistor Q1B since the base of transistor Q1B draws almost no current. The current $\Delta i'$ flows through the collector load and by choosing a value of $\beta$ such that $\Delta i'=\Delta i$ the gain of the stage is increased to unity since the drain of the load current by transistor Q1D is compensated. Thus for a unity gain stage, $\Delta i'=0.87\Delta v/1960=0.87(38.3)(\beta\Delta i)/1960$, and $\beta=58$. By choosing a $\beta$ slightly greater than 58, e.g., 60, for transistor Q1D (to compensate for the collector current of transistor Q1B being slightly less than the emitter current), the gain of the stage may indeed be the ideal value of unity.

Although the invention has been described with reference to particular embodiments it is to be understood that the arrangements disclosed are merely illustrative of the principles of the invention. Numerous modifications may be made therein and other arrangements may be devised without departing from the spirit and scope of the invention.

What is claimed is:

1. A conference circuit for a plurality of telephone lines comprising a plurality of transistors each having emitter, base and collector terminals, a plurality of means each for coupling the collector terminal of one of said transistors to the base terminal of another one of said transistors, means for biasing each of said transistors to conduction, a first plurality of transformers each for coupling the emitter terminal of respective transistor to one of said telephone lines and a second plurality of transformers each for coupling the collector terminal of said respective transistor to another one of said telephone lines.

2. A conference circuit in accordance with claim 1 wherein said biasing means includes a Zener diode connected between each of said collector terminals and the respective coupled base terminal.

3. A conference circuit in accordance with claim 1 further including means connected to each of said collector terminals for improving the stability of the conference circuit.

4. A conference circuit for a plurality of lines comprising a first plurality of transistors, means including a second plurality of transistors connected to said first plurality of transistors for biasing the transistors in said first plurality to conduction, a third plurality of transistors coupling the transistors in said first plurality to each other to form a loop, and a plurality of capacitors coupling the transistors in said first plurality to said plurality of lines.

5. A conference circuit in accordance with claim 4 further including means for connecting each of the transistors in said third plurality to a respective transistor in said second plurality to maintain a constant quiescent current flow through the transistors in said first and second pluralities.

6. A conference circuit in accordance with claim 4 wherein the number of transistors in said second plurality is twice the number of transistors in said first plurality with a respective two of the transistors in said second plurality being connected to each transistor in said first plurality, and wherein the number of transistors in said first plurality and the number of transistors in said third plurality are both odd, and further including means for preventing signal current variations in said second plurality of transistors.

7. A conference circuit comprising a plurality of transistors each having first, second and third terminals, means for biasing each of said transistors to conduction, means for coupling the first terminal of each of said transistors to the second terminal of another of said transistors to form a loop configuration, means including switching means for directly connecting the third terminal of each of said transistors to a telephone line, said third terminal being isolated from said coupling means of the first terminal, and means for introducing negative resistance in each of said coupling means to compensate for losses in said switching means.

8. A conference circuit comprising a plurality of transistors, means for biasing each of said transistors to conduction, means for connecting the emitter of each of said transistors to a telephone line, a plurality of amplifying transistors each having a base connected to the collector of a respective one of said transistors and a collector connected to the base of the same respective one of said transistors, means for biasing each of said amplifying transistors to conduction, means for coupling the signal at the collector of each of said transistors to the base of another respective one of said transistors to form a loop configuration, and resistance means included in said coupling means for providing with the respective ones of said amplifying transistors a negative impedance between successive ones of said transistors in said loop configuration.

9. A conference circuit comprising a plurality of telephone lines, a plurality of transistors each having first, second and third terminals, means for biasing each of said transistors to conduction, means for transmitting a signal dependent upon the signal developed at the first terminal of each of said transistors to the second terminal of another respective one of said transistors to form a signal loop, means including first switching means for coupling said first terminal of each of said transistors to a distinct one of said telephone lines, means including second switching means for coupling the third terminal of each of said transistors to another distinct one of said telephone lines and means for introducing a negative resistance in each of said transmitting means to compensate for losses in said first and second switching means.

10. A conference circuit comprising a plurality of transistors, means for biasing each of said transistors to conduction, means for connecting the emitter and collector of each of said transistors to respective telephone lines, a plurality of amplifying transistors each having a base connected to the collector of a respective one of said transistors and a collector connected to the base of the same respective one of said transistors, means for biasing each of said amplifying transistors to conduction, means for transmitting a signal to the base of each of said transistors in accordance with the signal developed at the collector of another respective one of said transistors to form a signal loop, and resistance means included in said transmitting means for providing with the respective ones of said amplifying transistors a negative impedance between successive ones of said transistors in said signal loop.

11. A conference circuit comprising a plurality of transistors, means connected to the emitter and collector terminals of each of said transistors for maintaining a constant quiescent current flow through said transistors, means connected to the emitter and collector terminals of each of said transistors for coupling each of said transistors to a pair of telephone lines, a plurality of amplifying transistors, means for coupling the collector of each of said transistors to the base of a respective one of said amplifying transistors and for coupling the base of each of said transistors to the collector of the same respective one of said amplifying transistors, a plurality of transistor coupling means, means for driving each of said transistor coupling means by a fraction of the signal developed by a respective one of said amplifying transistors, and means including resistance means for connecting each of said coupling transistors to the base of a respective one of said transistors.

12. A conference circuit comprising a plurality of transistors, a plurality of pairs of first and second transistor biasing means, each pair being coupled to the emitter and collector terminals of a respective one of said transistors for biasing said transistor to conduction, a plurality of transistor coupling means each for connecting the collector of one of said transistors to the base of another respective one of said transistors, means connecting each of said transistor coupling means to the associated one of said first transistor biasing means for maintaining constant quiescent currents through all of said first and second transistor biasing means and all of said transistors, and a plurality of negative resistance means each for connecting a respective emitter or collector terminal of said transistors to a telephone line.

13. A conference circuit for a plurality of telephone lines comprising a first plurality of transistors, means including a second plurality of transistors connected to said first plurality of transistors for biasing the transistors in said first plurality to conduction, a third plurality of transistors coupling the transistors in said first plurality to each other to form a loop, and a plurality of negative resistance means for coupling the transistors in said first plurality to said plurality of telephone lines.

14. A conference circuit for a plurality of lines comprising a plurality of amplifying devices each having input and output terminals, means for connecting the output terminal of each of said amplifying devices to the input terminal of another respective one of said amplifying devices, and a plurality of transformers coupling said amplifying devices to said lines.

15. A conference circuit for a plurality of lines comprising a plurality of amplifying devices, capacitor means for connecting said amplifying devices to respective ones of said lines, means connected to said amplifying devices for supplying quiescent currents through said amplifying devices and for presenting very large impedances to signal currents flowing through said amplifying devices and said lines, and means for coupling each of said amplifying devices to another respective one of said amplifying devices to form a loop configuration.

16. A conference circuit in accordance with claim 15 further including means for introducing an effective negative resistance in each of said coupling means.

17. A conference circuit for a plurality of telephone lines comprising a plurality of amplifying devices connected to respective ones of said telephone lines through switching means for developing signals dependent upon the signals transmitted in the respective ones of the connected telephone lines, a plurality of means each for connecting one of said amplifying devices to another respective one of said amplifying devices for controlling the signals developed by said amplifying devices to be dependent upon the signals developed by the respective connected amplifying devices as well as the signals transmitted in the respective connected telephone lines, and means for inserting an effective negative resistance in series with each of said connecting means to overcome the losses in said switching means.

18. A conference circuit for a plurality of telephone lines comprising a plurality of amplifying devices connected to respective ones of said telephone lines for developing signals dependent upon the signals transmitted in the respective ones of the connected telephone lines, a plurality of means each for transmitting a fraction of the signal developed by one of said amplifying devices to another respective one of said amplifying devices for controlling the signal developed by said respective one of said amplifying devices, and negative resistance means coupled to each of said transmitting means.

19. A conference circuit for a plurality of telephone lines comprising a plurality of amplifying devices, means for connecting each of said amplifying devices to another respective one of said amplifying devices for controlling the signal developed by each of said amplifying devices to be dependent upon the signal developed by the respective connected one of said amplifying devices, means connected to each of said amplifying devices for supplying a quiescent current for each of said devices and for presenting a very high impedance to signal currents developed by said amplifying devices, and negative impedance means connecting said telephone lines to said amplifying devices for controlling the signals developed by said amplifying devices to be dependent upon the signal currents in the connected telephone lines and for controlling the signal currents in said telephone lines to be dependent upon the signals developed by said amplifying devices.

20. A conference circuit for at least three telephone lines comprising at least three active devices, means for interconnecting said active devices to form a loop configuration, means for biasing each of said active devices to conduction, and a plurality of means for coupling said telephone lines to said active devices.

21. A conference circuit in accordance with claim 20 wherein each of said coupling means is a transformer and further including means for controlling the signal gain of each of said active devices to be less than unity.

22. A conference circuit in accordance with claim 20 wherein each of said interconnecting means includes an amplifying element and means for controlling a fraction of the signal developed by each of said active devices to be transmitted through the respective amplifying element to the respective connected active device.

23. A conference circuit for a plurality of telephone lines comprising a plurality of active devices, a plurality of means each for connecting one of said active devices to another respective one of said active devices to form a loop configuration, a plurality of constant current means connected to said active devices for biasing said active devices to conduction, and a plurality of means for coupling said telephone lines to said active devices for allowing signal currents to flow between said active devices and said telephone lines, and means operative with each of said connecting means for presenting a negative resistance to signal currents transmitted from said active devices through said connecting means to the respective connected active devices.

24. A conference circuit in accordance with claim 23 further including a negative resistance pad connected in series with each of said coupling means.

25. A communication network for a plurality of communication paths comprising a plurality of signal transmitting devices arranged in a loop configuration, means for biasing each of said devices to conduction, and means for connecting said communication paths to said devices for transmitting signals between said communication paths and said devices and for controlling the transmission of said signals through said devices in said loop.

26. A conference circuit in accordance with claim 25 further including means connected to each of said devices for amplifying the signals transmitted through said devices.

27. A conference circuit for a plurality of lines comprising a first plurality of transistors, means including a second plurality of transistors connected to respective ones of the transistors in said first plurality and a third plurality of transistors connected to respective ones of the transistors in said first plurality for biasing the transistors in said first plurality to conduction, a fourth plurality of transistors coupling the transistors in said first plurality to each other to form a loop, means connecting each of the transistors in said fourth plurality to a respective transistor in said second plurality to maintain a constant quiescent current flow through the transistors in said first, second and third pluralities, positive feedback means coupling the signal developed by each of the transistors in said fourth plurality to a respective transistor in said third plurality to compensate for any signal current drained by said transistor in said fourth plurality from the respective transistor in said first plurality, and a plurality of capacitors coupling the transistors in said first plurality to said plurality of lines.

28. A conference circuit for a plurality of lines comprising a plurality of amplifying devices, capacitor means for connecting said amplifying devices to respective ones of said lines, means connected to said amplifying devices for supplying quiescent currents through said amplifying devices, means for coupling each of said amplifying devices to another respective one of said amplifying devices to form a loop configuration, and positive feedback means connected between each of said coupling means and the respective one of said quiescent current supplying means to compensate for any signal current flowing between the respective amplifying device and said coupling means.

29. A conference circuit for a plurality of telephone lines comprising a plurality of active devices; a plurality of means, each including a positive feedback network, each for connecting one of said active devices to another respective one of said active devices to form a loop configuration; a plurality of means connected to said active devices for biasing said active devices to conduction; and a plurality of means for coupling said telephone lines to said active devices for allowing signal currents to flow between said active devices and said telephone lines.

30. A conference circuit for a plurality of telephone lines comprising a plurality of transistors each having first, second, and base electrodes, means for connecting each first electrode to the base electrode of the succeeding transistor to form a loop configuration, terminating means connected to each first and second electrode, at least certain of said terminating means comprising telephone lines, and biasing means connected to each of said transistors.

31. A conference circuit in accordance with claim 17 wherein each of said amplifying devices has a plurality of output terminals and each of said output terminals is connected to a respective one of said telephone lines.

32. A conference circuit in accordance with claim 20 wherein two of said telephone lines are coupled to each of said active devices.

33. A conference circuit in accordane with claim 32 wherein the number of said active devices interconnected to form a loop configuration is an odd number.

34. A conference circuit in accordance with claim 32 wherein said means for biasing each of said active devices to conduction includes a plurality of constant current means.

35. A communication network in accordance with claim 25 wherein a pair of said communication paths is connected to at least certain of said devices arranged in said loop configuration.

36. A communication network in accordance with claim 35 wherein the number of said devices arranged in said loop configuration is an odd number.

37. A communication network for a plurality of communication paths comprising a plurality of signal transmitting devices arranged in a loop configuration, and means for connecting two of said communication paths to each of said devices to control the signal in each of said communication paths to be dependent upon the signals transmitted from all of the others of said communication paths.

38. A communication network in accordane with claim 37 comprising transformer means coupling each of said communication paths to said devices.

39. A communication network in accordance with claim 37 comprising capacitor means for connecting each of said communication paths to said devices.

References Cited

UNITED STATES PATENTS 3,364,309 1/1968 Hörner ______________ 179—1

FOREIGN PATENTS 1,182,304 11/1964 Germany.

KATHLEEN H. CLAFFY, *Primary Examiner.*

A. GESS, *Assistant Examiner.*

U.S. Cl. X.R.

179—1